US007013022B2

(12) United States Patent
Dugue et al.

(10) Patent No.: US 7,013,022 B2
(45) Date of Patent: Mar. 14, 2006

(54) METHOD AND DEVICE FOR CHARACTERIZING OR CONTROLLING ZONES OF TEMPORAL FLUCTUATIONS OF A SCENE

(75) Inventors: Jacques Dugue, Montigny le Bretonneux (FR); Lynda Mouloudj, Rosny Sous Bois (FR); Isabelle Hibon, Le Mans (FR); Richard Soula, Vertou (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 756 days.

(21) Appl. No.: 09/956,063

(22) Filed: Sep. 20, 2001

(65) Prior Publication Data
US 2002/0051579 A1    May 2, 2002

(30) Foreign Application Priority Data
Sep. 21, 2000    (FR) .................................. 00 12022

(51) Int. Cl.
*G06K 9/00*    (2006.01)

(52) U.S. Cl. ......................... 382/100; 348/143; 348/83

(58) Field of Classification Search ................ 348/143, 348/83; 382/100
See application file for complete search history.

(56) References Cited

U.S. PATENT DOCUMENTS

| | | | | |
|---|---|---|---|---|
| 3,718,758 | A | * | 2/1973 | Ponghis et al. ................ 348/83 |
| 4,555,800 | A | * | 11/1985 | Nishikawa et al. ......... 382/203 |
| 4,868,652 | A | * | 9/1989 | Nutton ........................ 348/167 |
| 4,909,731 | A | * | 3/1990 | Zinn et al. ..................... 432/58 |
| 4,965,841 | A | | 10/1990 | Kaneko et al. |
| 5,249,954 | A | * | 10/1993 | Allen et al. .................... 431/14 |
| 5,748,775 | A | * | 5/1998 | Tsuchikawa et al. ......... 382/190 |
| 5,784,300 | A | * | 7/1998 | Neumeier et al. ........... 702/106 |
| 5,971,747 | A | | 10/1999 | Lemelson et al. |

FOREIGN PATENT DOCUMENTS

EP    0 671 706 A2    9/1995

\* cited by examiner

*Primary Examiner*—Jingge Wu
*Assistant Examiner*—A. Upreti
(74) *Attorney, Agent, or Firm*—Buchanan Ingersoll PC

(57) ABSTRACT

The invention relates to a method of processing images of at least one flame or of a scene in a furnace, characterized in that it comprises at least one sliding statistical processing of the images of the flame which are captured in the course of a sliding time interval, so as to eliminate the fast fluctuations therefrom.

49 Claims, 7 Drawing Sheets

METHOD AND DEVICE FOR CHARACTERIZING OR CONTROLLING ZONES OF TEMPORAL FLUCTUATIONS OF A SCENE

BACKGROUND OF THE INVENTION

1. Field of the Invention

The present invention relates to the field of the characterization and/or control of zones of temporal fluctuations of a scene.

More precisely, it relates to a method and to a device for the characterization and/or control of zones of temporal fluctuation of a scene, implementing an image processing system.

It applies to the characterization and/or to the control of flames, for example in a furnace, especially an industrial furnace, or in any other type of environment.

The invention can also be applied to other characteristics of industrial furnaces.

In general, the invention makes it possible to characterize, on the basis of a video signal arising from a positionally fixed camera, the zones of temporal fluctuations of a flame or of a scene in a furnace. The invention makes it possible among other things to distinguish and/or to separate the zones of temporal fluctuations from the static zones.

2. Description of the Related Art

The control of the thermal state of an industrial furnace is ordinarily carried out by the use of a small number of sensors. The sensors commonly employed are gas bleed systems which allow the characterization of the composition of the smoke and/or thermocouples which offer a measurement of the local temperature of the walls of the furnace or of the charge, and/or sensors which carry out a spectroscopic measurement of the combustion along an optical axis (termed "line-of-sight") for flame control or monitoring purposes (safety).

However, the temperature sensors present in a furnace, on account of their small number, cannot always provide information about the drifting of the flame characteristics over time The absence of detection of a flame which does not conform through its geometry, length or position may result in premature wear of the refractory walls of the furnace, degraded quality of the product made, and the emission of pollutants beyond the limits of the environmental standards.

Video cameras are sometimes used on industrial furnaces in order to afford the operators a view of the interior of the furnace. The quality of the visual information is nevertheless limited by the strongly fluctuating nature of the flame, due to turbulence, and by the subjective character of the interpretation.

Commercial computerized systems have very recently appeared which offer continuous tracking of the flame through analysis of video images. These flame characterization systems, however, do not make it possible to remedy the above mentioned problems.

Patent U.S. Pat. No. 5,249,954 describes an analysis, by a CCD sensor, of the chemiluminescence of the flame, in association with a neural network, for correlating various chemiluminescence fields with the ratio of oxidant/fuel flow rates. Here again, this type of device does not make it possible to provide information about the drifting of the characteristics of the flames over time.

Patent U.S. Pat. No. 5,971,747 describes an automated system for controlling combustion, which implements video cameras, image processing by a neural network, and a fuzzy logic control system. It is combined with other types of sensors, such as photodetectors, temperature sensors or pressure sensors. Such a system is very complex and does not make it possible to solve the problems of the wearing of the walls, of the degraded quality of the product made and of the emission of pollutants related to the drifting of the characteristics of the flames over time.

Finally, none of these known techniques is compatible with characterization and/or regulation of a flame, outside a furnace, for example in the open air.

Neither are any techniques known which can be applied to the characterization and/or to the control of temporal fluctuations of a scene of an industrial furnace, such as for example the charge of a furnace.

SUMMARY OF THE INVENTION

An object of the invention is to provide a method and a device making it possible to track the geometric characteristics of a flame, or of a scene in an industrial furnace, so as to detect non-conforming operations, for example of a burner, or of a fuel and/or oxidant feed, or of operations which, in the case of a furnace, may cause the premature wearing of the refractory walls of the furnace and which, in all cases, may lead to degraded quality of the product made, and/or to the emission of pollutants beyond the limits of the environmental standards.

According to the invention, a "sliding" statistical processing of images of flames or of images of a scene in a furnace, which are obtained for example with the aid of cameras, is performed with the aid of an image processing, the said processing eliminating the fast fluctuations of the content of the images.

The images are captured in the course of a sliding time interval, the duration of which may be variable, in particular on account of the greater or lesser speed with which the statistical processing is performed.

According to another aspect, the invention also relates to a method of processing images of a flame or of a scene in a furnace, characterized in that, after having acquired n images of the flame or of the scene:

(a) at least one statistical processing of the last n images is performed (b) a new image is acquired when the processing (a) is finished (c) step (a) is repeated.

The images acquired are stored with a view to the statistical processing, the statistical processing taking into account only the last n images acquired or recorded or stacked. The acquisition of a new image entails the elimination, from the memory or from the stack in which the images are stored, of the image acquired earliest.

Preferably, the statistical processing is performed on a series of images such that:

1. the gap between the last image processed (the present instant) and the earliest is between 5 and 1000 seconds, preferably between 20 and 200 seconds,
2. and/or the number of images contained in the series and participating in the calculation of a statistical result is greater than 5, preferably between 25 and 1000.

According to another aspect of the invention, the statistical processing is performed on a series of images such that the gap between two successive images is between 5 seconds and 1000 seconds, preferably between 20 seconds and 200 seconds.

The statistical processing carried out can be a calculation of variance of the images over time.

This can also be a calculation of sliding average of the images of the flame or of the scene which are captured in the course of the sliding time interval.

This can also be a processing making it possible to obtain, from each image, an image of its instantaneous fluctuations, or else also a processing making it possible to obtain the spatial envelope of the fluctuations of the flame or of the scene.

It is possible, furthermore, to select the points of the image obtained whose intensities are greater than a certain threshold.

This method can, furthermore, comprise a step of extracting the contour of the spatial envelope of the fluctuations of the flame or of the scene.

Likewise, it can furthermore comprise a step of determining a rectangle which contains or which encompasses the contour of the flame or of the zones of temporal fluctuation of the scene, and/or a calculation of the centre of gravity and/or of the area and/or of the perimeter of this contour.

A method of processing images according to the invention can be combined with a step of regulating a physical parameter of a flame, or of a combustion or of a furnace in which the combustion or the scene is occurring, or of one or more burners.

More precisely, it is possible to distinguish between the parameters to be regulated (geometric characteristics of the flame) and the parameters which are acted upon.

The invention also relates to a device for implementing a method according to the invention, in particular as described hereinabove.

Thus, the invention also relates to a device for characterizing images of a flame or of a scene in a furnace, comprising means for carrying out a sliding statistical processing of the images. As explained hereinabove, such processing makes it possible to eliminate the fast fluctuations of the flames or of the scene.

The invention also relates to a device for processing images of a flame or of a scene in a furnace, comprising:
  means for storing n images of the flame or of the scene, acquired chronologically,
  means for performing at least one statistical processing of the last n images,
  means for storing an additional image, when the statistical processing is finished

BRIEF DESCRIPTION OF THE FIGURES OF THE DRAWINGS

The characteristics and advantages of the invention will become more apparent in the light of the description which follows. This description pertains to the exemplary embodiments given by way of nonlimiting explanation, whilst referring to the appended drawings in which.

DETAILED DESCRIPTION OF THE PREFERRED EMBODIMENTS

According to the invention, a "sliding" statistical processing is applied to the images.

Figure 1A:
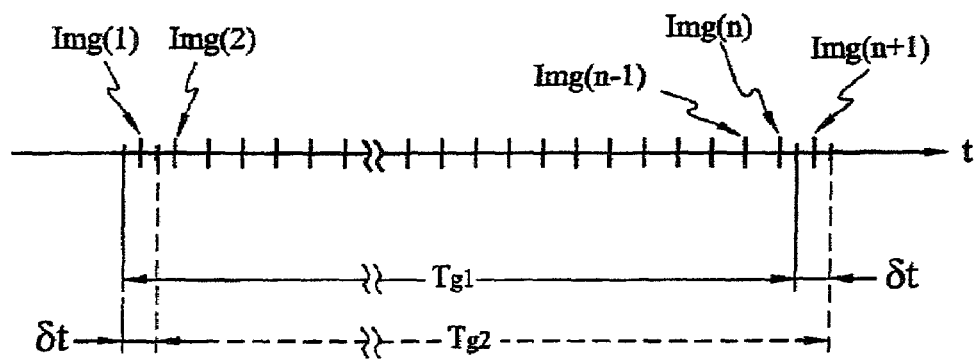
FIGS. 1A, 1B and 2 represent time charts for image acquisition according to the invention.

This processing is applied to n successive images as illustrated in FIG. 1A. A sliding interval of duration Tg is defined, in which n images Img(i), i=1, . . . , n are recorded and stored in memory, at the instants 1, 2, . . . , n.

These n images are processed, according to a statistical processing such as one of those described hereinbelow.

At the instant n+1, a new image Img(n+1) is stored, and the statistical processing is applied to the images Img(2), . . . , Img(n+1). The image Img(1) is deleted from the memory or from the stack of images to be processed.

The n images are situated in an interval of duration Tg, which moves with a stride of predetermined duration $\delta t$.

Figure 1B:
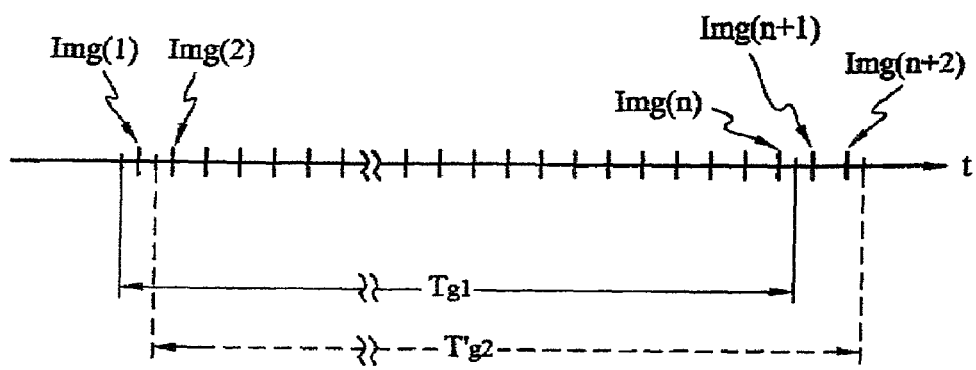

However, as illustrated in FIG. 1B, if, at the instant n+1, the statistical processing of the n images is not completed, the image acquisition Img(n+1) does not take place.

If the statistical processing of the images Img(1), . . . , Img(n) is finished at the instant n+2, the image Img(n+2) is recorded and statistical processing is applied to the n images Img(2), . . . , Img(n−1), Img(n), Img(n+2).

The sliding time interval is then variable (Tg1≠Tg2).

Figure 3:
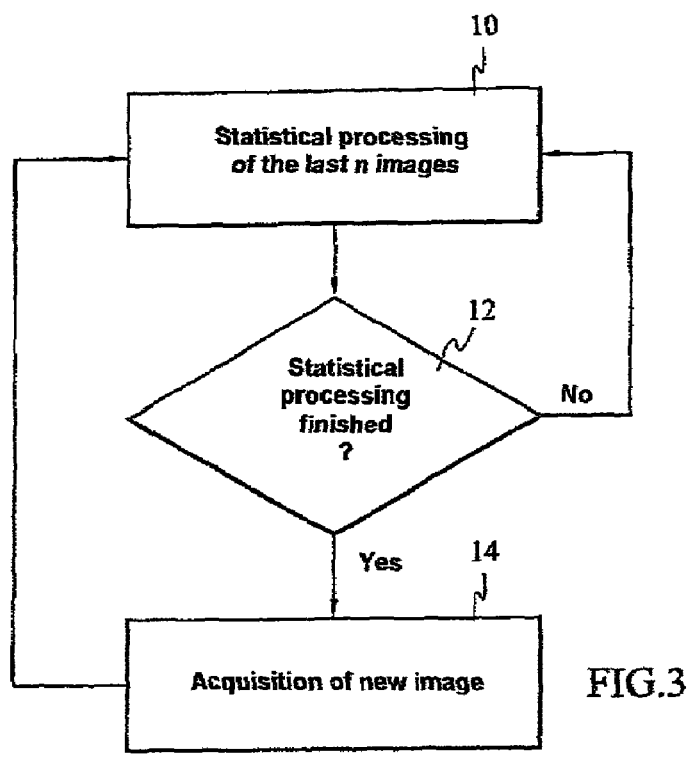
FIG. 3 is a flow chart representing an aspect of a statistical processing according to the invention, FIGS. 4, 5 and 6 respectively represent an instantaneous image of a flame, a sliding average of several instantaneous images and an instantaneous flame envelope.

This is conveyed by the flow chart of FIG. 3.

The last n images are processed statistically (step 10). A check is then made as to whether the statistical processing has finished (step 12).

The acquisition of a new image (step 14) takes place only if the last n images previously acquired or stored have been processed.

According to yet another aspect, it is sometimes desirable to impose a minimum time interval between the acquisition of two consecutive images. This may be the case if the computer executes the calculations rapidly with respect to the desired time window.

Preferably, the calculations are done by recurrence: when a new image is captured, the algorithm does not need to recalculate all the images in the stack. It is sufficient to take into account (to add) the contribution from the new image, and to deduct the contribution from the oldest image which will be overwritten.

In certain cases, for example in the case of oscillatory combustion, it may be beneficial to select images in phase with the combustion cycle. This is the case of FIG. 2, where the images are recorded at the instants t1, t2, t3, t4, corresponding for example to specified phases of a combustion process, for example to a specified state of opening of a fuel or oxidant feed valve.

Figure 2:
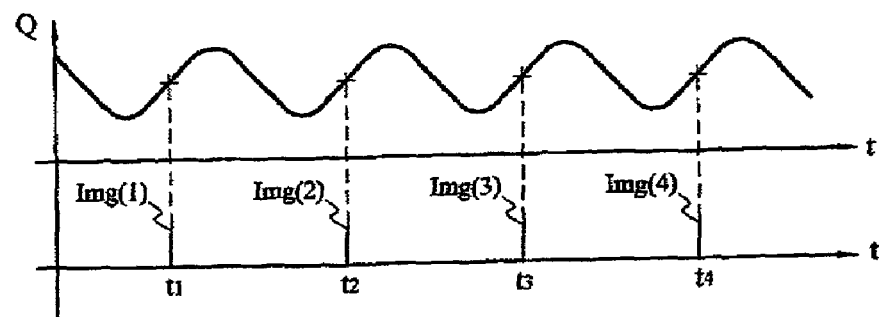

In the case of FIG. 2, the upper part represents the temporal profile of the flow rate Q of a fuel injected into a burner.

This profile is periodic (here: sinusoidal) and image acquisition takes place only when the flow rate Q is at a predetermined phase of its cycle. Other examples may relate to any other type of variation or of periodic phenomenon of an oscillatory combustion, image acquisition being synchronized with this variation or this periodic phenomenon or being carried out only for a predetermined phase of this variation or periodic phenomenon.

Here again, it is preferable to wait for the end of the statistical calculation carried out on the last n images before acquiring a new image, as already explained hereinabove in connection with FIGS. 1B and 3.

The statistical processing implemented according to the invention is sliding, this signifying that it is performed on a stack of n sliding images: hence, it is not frozen over time. When a new image is captured (for example: the image n+1 in FIG. 1A, or the image n+2 in FIG. 1B), it overwrites the oldest image (image 1) of the stack. Thus, the allocation of memory for the algorithm always corresponds to the number of stacked images to which the statistical processing is applied.

The number n of images is chosen by the user on initializing the calculation.

A number greater than 5, for example between 5 or 10 and 1000, for example equal to 20 or 25 or between 25 and 1000, or again between 20 or 25 and 200, or else greater than 50, makes it possible to obtain a sufficient smoothing effect of the video noise over the set of n images All the fluctuations in the image are regarded as noise for the eye. Consequently, the fluctuations of the flame or of the scene viewed in a furnace, as well as the background of the image, will also be smoothed.

The time interval Tg adopted for selecting the images is preferably between 10 s and 1000 s. A duration of around 10 s is well suited to the nature of the turbulence which may appear in a flame or in a furnace, the turbulence having durations of less than 10 s. The upper bound of the interval (around 1000 s, or over 10 minutes) is chosen in such a way that the information resulting from a statistical processing of images acquired over this duration is still meaningful to the observer, in relation to the combustion process in progress, or does not reach him after too great a delay in relation to this process.

It follows from the explanations given hereinabove in connection with FIGS. 1B and 3 that this time interval Tg can be variable. Thus, in FIG. 1B: T'g$_2$ is different from Tg$_1$. In general, the length of this interval is dependent on the number n of images to be acquired with a view to a statistical processing, as well as on the speed of calculation of the computer which performs the statistical processing. A user can define, before any statistical calculation is performed, an (approximate) duration for Tg. However, an actual acquisition does not in fact occur over a duration strictly equal to Tg, the duration of acquisition possibly being greater or slightly greater when a statistical calculation has not finished at the instant at which a new acquisition ought to be carried out.

Figure 4:

FIG. 4 represents an exemplary instantaneous image Img.

The walls 20 of the furnace and the burner 22 may be seen therein, together with its various orifices for injecting fuel and oxidant.

A first exemplary statistical processing on n images is a variance calculation on these n images. An image is therefore obtained, each pixel or zone of which is the result of the variance calculation for the pixel or the corresponding zone on all the images. Large values of intensity on this image correspond to the zones where the intensity fluctuations are large, and small values correspond to the zones where the fluctuations are small.

The variance is defined as the difference between the average image of a sequence of images and an instantaneous image. For a stack of n images, the variance (denoted V) is expressed for example by the formula:

$$V = \left[\frac{1}{n}\sum_{i=1}^{n}(\bar{x} - x)^2\right]$$

with $\bar{x}$ the average image of the stack, and x the instantaneous image.

The variance tends to zero if the images are all identical, that is to say if there is no motion from one image to another. Indeed, there is then no difference between the averaged image and an instantaneous image. In the present invention, the variance provides information about the fluctuations of the flame.

The standard deviation image is defined as follows in the article "Average Centerline Temperature of a Buoyant Pool Fire Obtained by Image processing of video recordings", L. Audouin, G. Kolb, et al (1995), Laboratoire de combustion et de détonique [Laboratory for combustion and detonation theory] (Université de Poitiers):

$$I' = \left[\frac{1}{N}\sum_{i=1}^{N}I^2 - \left(\frac{1}{N}\sum_{i=1}^{N}I\right)^2\right]^{1/2}$$

where I is the grey level of each pixel for each instantaneous image. The variance is the square of the standard deviation.

A second exemplary statistical processing on n images, which can be applied in the framework of the present invention, is a sliding average processing (or "running average").

The sliding average calculation is used for the algorithms for the envelope of the fluctuations of flames or of a scene in a furnace and can also be used for the calculations of colour ratios. It is for example an operation of point-by-point summation of matrices, performed for example on ½-scale images (384 *288 pixels).

The mathematical expression for the algorithm is as follows:

$$x_{t+1} = x_t + \frac{\cdot \cdot \cdot}{N}$$

where:
t+1 is the instant of acquisition of image i+1
t is the instant of acquisition of image i
x$_{i+1}$ represents image i+1, newly acquired
x$_1$ represents image 1, that is to say the oldest image of the stack; this image will be overwritten by the new image which will enter the stack.

This algorithm is recurrent, in the sense that it does not have to recalculate the average from all the initial images; it merely needs the addition of the quantity (X$_{i+1}$_X$_i$)/N after each new acquisition.

Figure 5:
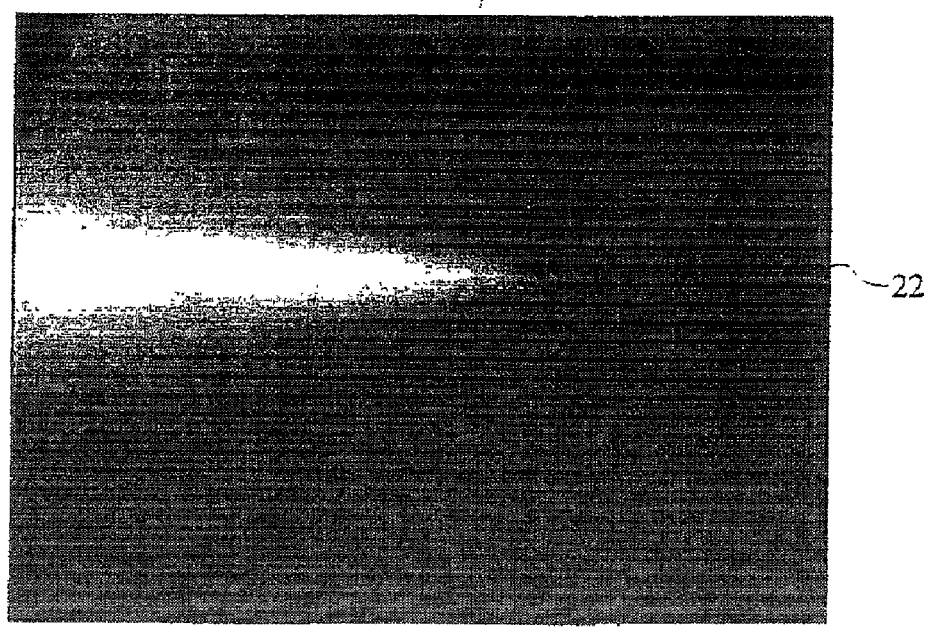

FIG. 5 shows a mean averaged over 60 images. This figure shows the static zones 20 of the image, which are the refractory walls. The reference 22 designates the outlet of the burner and the reference 24 the smoothed image of the flame. Typically, on an image captured in an industrial furnace (for example: image of a flame or of a bath in a furnace), the static zones are the refractory walls and the fluctuating zones are the turbulent flames and/or, possibly, the charge (bath of glass, of molten metal, etc). The processing by sliding average gives an information smoothing effect and therefore tends to suppress the zones of fluctuation of the flame or of the scene viewed.

The result image obtained is of good quality, irrespective of the processing time, of the noise due to the video acquisition electronics.

This result image is used to more easily determine the threshold to be chosen for the subsequent calculations. Specifically, it is possible to determine a value of intensity or the value of maximum intensity on the walls (zones 20 of FIG. 5). The threshold is then selected at this value of intensity of the walls.

A third processing example or processing algorithm makes it possible to track the fluctuations of the flame image by image.

This example in fact makes it possible to obtain an intermediate result for later calculations.

According to this processing, the image of the sliding average Avg is calculated then is subtracted from each of the instantaneous images of the stack. Next, the absolute value image of each of the result images is binarized according to a threshold chosen by the user.

Finally, a check is made as to whether the statistical processing has finished. If it has not, it is completed by returning to the previous steps. If it has, a new image is acquired.

The image of rank 1 is then overwritten or eliminated from the stack and replaced with the image of rank 2. Likewise, the image of rank i+1 replaces the image of rank i, for every i between 1 and n. The new average is calculated over the new last n images thus obtained.

Subtracting the average from each instantaneous image removes the static envelope of the flame. This leaves only its instantaneous fluctuations. A simple mathematical expression for the algorithm is as follows:

Bin(Abs(Im(i)−Avg), threshold)

where:
Im(i) is the instantaneous image captured at the instant i,
Avg is the average over the last n images,
Abs is the operation of calculating the absolute value,
Bin is the binarization operation performed with respect to an intensity threshold chosen by the user (the pixels of Abs(Im(i)−Avg) whose intensity exceeds, or is equal to, this value are set to 1, those which are below it are set to 0).

Figure 6:
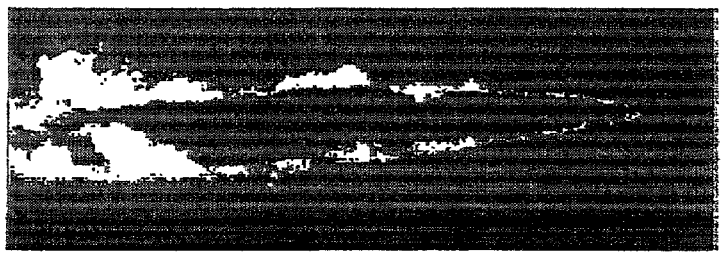

An exemplary image obtained (also referred to as the instantaneous flame envelope) is represented in FIG. 6.

This image helps to detect pointwise abnormal states of the flame (drifting or variation of its geometry).

This third algorithm makes it possible to highlight the zones where the luminous intensity fluctuates over time. It also makes it possible to delete the zones where the luminous intensity is constant, and to accentuate the edges of the flame.

A fourth and a fifth algorithm make it possible to detect the envelope of the fluctuations of the flame.

The fourth algorithm implements the third exemplary processing above. It uses the sliding average as reference image for subtracting the background noise from the result image. For each image of the sequence, the absolute value of the difference between the image and the averaged image of the series is calculated. This result image is then binarized with respect to an arbitrary threshold, then averaged with the other images of the series.

A check is then made as to whether the statistical processing has finished. If it has not, it is completed by returning to the previous steps. If it has, a new image is acquired. The image of rank 1 is then overwritten or eliminated from the stack and replaced with the image of rank 2. Likewise, image i+1 replaces image i, for every rank i between 1 and n. The new average is calculated.

The expression for the algorithm for calculating the flame envelope can be summarized by the following expression:

Flame envelope1=Avg(Bin(Abs(Img($i$)−Avg), threshold))

where:
Avg is the sliding average ("running average"), as already explained hereinabove (second exemplary processing),
Bin is the operation of binarization according to the threshold defined by the user (the pixels of Abs(Img(i)−Avg) whose intensity exceeds, or is equal to, this value are set to 1, those which are below it are set to 0),
Im(i) represents each instantaneous image of the stack of images.

The choice of threshold depends on the values of grey levels of the starting image (average image of the last n images). These values make it possible to separate the background noise from the foreground flame. The threshold therefore makes it possible to identify the zones of fluctuations whose amplitudes exceed this value. This threshold, defined by the user, makes it possible to eliminate all the low-intensity fluctuations caused by the video noise in the static zones. Thus, only the zones of fluctuations of intensities greater than the threshold are visible in the result image.

Figure 7:
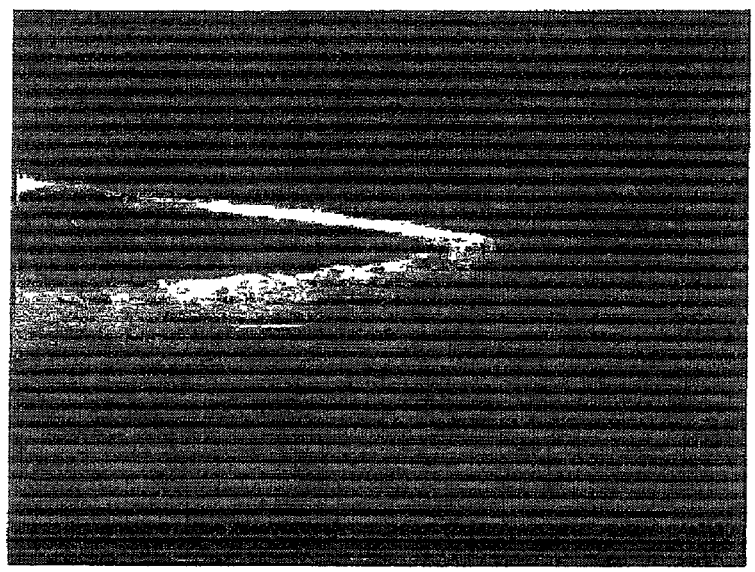
FIGS. 7, 8, 10, 11 represent various images obtained through image processings according to the invention.

An exemplary image obtained through this fourth algorithm is given in FIG. 7.

The fifth algorithm consists in calculating the absolute value of the difference between an instantaneous image and that which precedes it in the stack. Subtraction of two consecutive images makes it possible to highlight what has changed between the two instants. The result image is transformed into a binary image according to an arbitrary threshold. It is then averaged (by sliding average) with the other images of the stack.

A check is then made as to whether the statistical processing has finished. If it has not, it is completed by returning to the previous steps. If it has, a new image is acquired. The image of rank 1 is then overwritten or eliminated from the stack and replaced with the image of rank 2. Likewise, image i+1 replaces image i, for every value of i. The new average is calculated.

The fifth algorithm is expressed mathematically as follows:

Flame envelope2=Avg (Bin(Abs(Img($i$)−Img($i$−1)), threshold))

where:
Avg is the sliding average,
Bin is the operation of binarization according to an arbitrary threshold (the pixels of Abs(Img(i)−Img(i−1)) whose intensity exceeds, or is equal to, this value are set to 1, those which are below it are set to 0),
Im(i) represents each instantaneous image of the acquisition stack,
Im(i) and Im(i−1) are two successive images of the acquisition stack.

Figure 8:
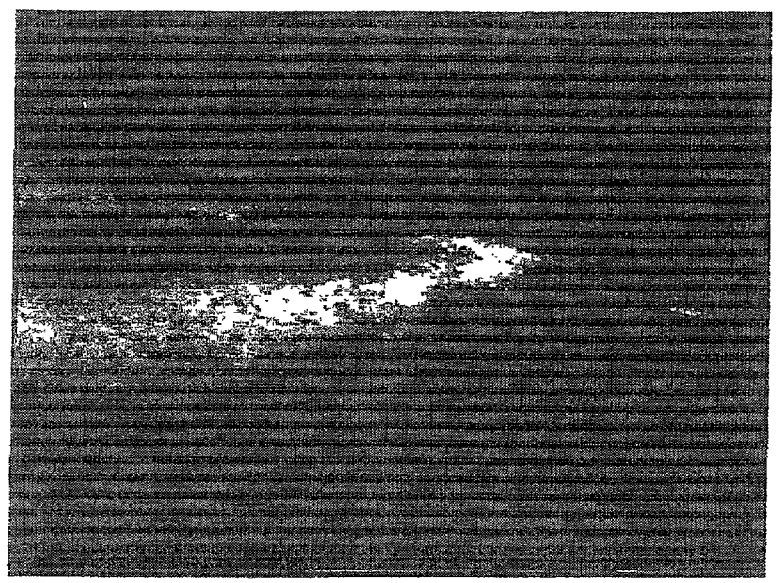

FIG. 8 shows the result of a "flame envelope 2" algorithm.

The images of FIGS. 7 and 8 are examples obtained by executing the algorithms on stacks of 60 images. In both cases, the static walls of the furnace have disappeared from the image. They are coloured black and the flame contour is smoothed.

For the fourth algorithm, the result image is no longer sensitive to the fastest variations of the flame.

The difference between the fourth and fifth algorithms is that the fourth is influenced by the contribution of the last n images of the stack whilst the fifth is a more instantaneous result.

By subtracting the average, the fourth algorithm highlights the constant part of the flame (coloured black in the core of the flame in FIG. 7). Hence, the fluctuating edges of the flame also stand out better in this result image. The information of the fifth algorithm is more instantaneous.

A sixth exemplary calculation or algorithm is a calculation of "instantaneous intermittence" prior to the seventh algorithm. Such a calculation, applied to the initial images, depends on another threshold chosen by the user of the software. Each pixel exceeding the chosen value is set to 1 (white in the image) and the pixels below the predetermined threshold are set to 0 (black in the image).

This algorithm may be written mathematically as follows:

Instantaneous intermittence=Bin(Im($i$), threshold)

An instantaneous intermittence image is a binary image which provides information about the probability of exceeding a fixed threshold by the user (p=0%=black or p=100%=white). Consequently, the threshold chosen determines the presence of flame in the image. The binary image, whose pixel values are 0 or 1, will be white at the location of the flame and black if no pixel surpasses the threshold value.

Figure 9:
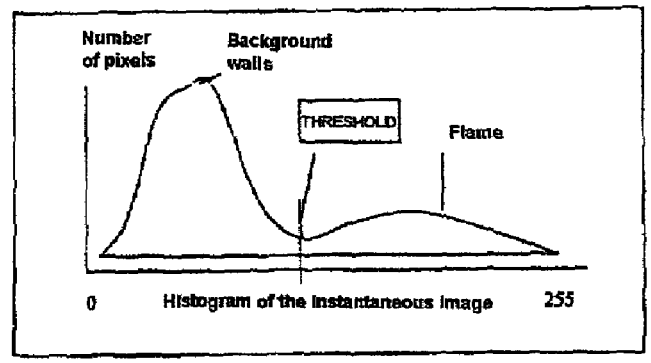
FIG. 9 is a histogram of the intensity levels of an image.

The histogram of the grey level values of a flame image can help the user to choose the threshold. The threshold value generally lies above the maximum intensity of the walls. FIG. 9 represents the typical histogram of an image captured in a furnace.

It is possible to carry out (seventh exemplary calculation or algorithm) a calculation of "average intermittence", which is the sliding average over time of the instantaneous intermittences. The pixels of the image therefore vary from 0 to 255, and their grey levels (or intensities) represent the probability of exceeding the chosen threshold, in the course of the time interval of the sliding window.

Figure 10:
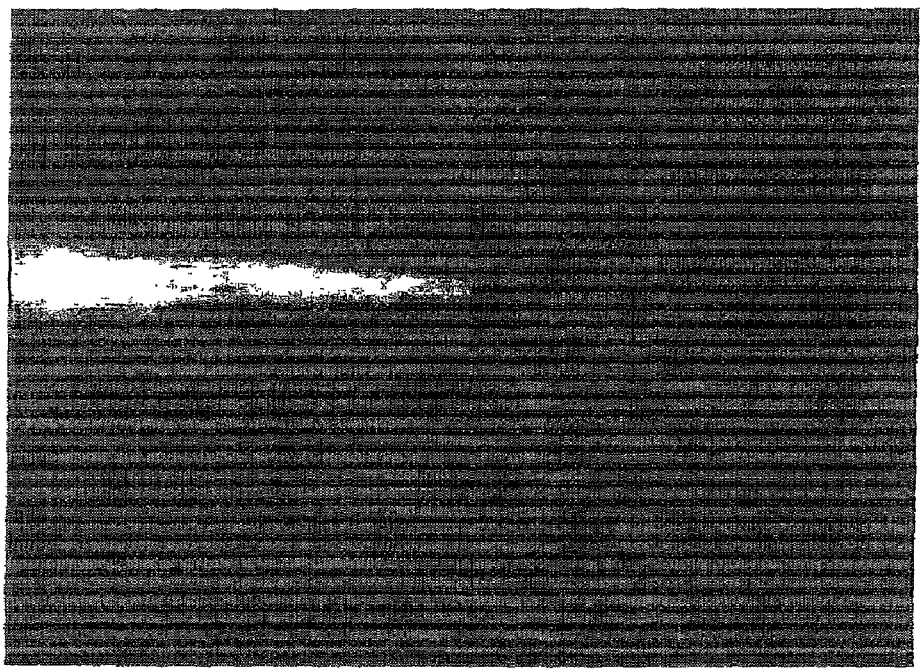

The image of the probability of exceeding a threshold of luminosity greater than the luminosity of the walls therefore makes it possible to highlight the presence and effective position of the flame in the image as shown by FIG. 10.

The mathematical expression for this algorithm is as follows:

Avg(Bin(Im($i$)), threshold), where

Avg is the sliding average,

Bin is the operation of binarization of the instantaneous image Im(i) according to the arbitrary threshold: a pixel of Im(i) is set to 0 (or to 1) if its intensity is less than (or greater than) the threshold.

The use of a threshold according to one of the third to seventh algorithms is advantageous for erasing the noise from the image and the luminosity of the walls and for extracting the flame contour. This type of algorithm has certain limits. Specifically, it is possible in this way to characterize the flame only if it is brighter than the background. But this is not always the case on industrial sites, in particular by reason of the low luminosity of certain flames with respect to the radiation of the refractory walls. The image of the result is dependent on the choice of the threshold, but it is compensated for by the systematic aspect of this dependence which allows a comparison of the result images over time.

The fourth, fifth and seventh algorithms implement the function AVG(BIN(_, threshold)), the argument being, respectively, Abs(Img(i)−Avg) (fourth algorithm), Abs(Img(i)−Img(i−1)) (fifth algorithm) and Abs(img(i)) (seventh algorithm).

Consequently, according to another definition of the invention, a statistical processing implemented comprises:

the calculation of a binary image, with respect to a threshold, from an argument image, a pixel of this argument image being set to 0 (or to 1) by the binarization operation, if its intensity is less than (or greater than or equal to) the threshold, a calculation of the average of the binary images thus obtained.

The argument image can for example be one of the three image types indicated hereinabove, Abs(Img(i)−Avg), Abs(Img(i)−Img(i−1)) or Abs(Img(i)).

Beyond the simple use as display of an image which is easier to interpret by an operator, the envelope of the fluctuations of the flame, obtained by one of the fourth and fifth algorithms or the images of instantaneous or average intermittence (sixth and seventh algorithms), may be used to extract quantitative geometrical parameters such as the perimeter, the area, the length of the flame. It is possible to apply a method of detecting an object (here the flame) by image processing, for example by contour extraction, or else "contour segmentation".

According to an exemplary contour extraction, an image is firstly binarized with respect to a grey level chosen by the user. For example, the value 1 or 0 is allocated to each pixel of the image depending on whether this pixel is regarded as forming part or not forming part of the flame. Next, the image is dilated by a wider pixel. Then the original image is subtracted from the image dilated by a pixel. The result of this subtraction is one or more continuous contour(s), one pixel thick. Finally, this or these contours are overlaid on the result image (for example "flame envelope 1" or "flame envelope 2"), by adding the two images.

Figure 11:
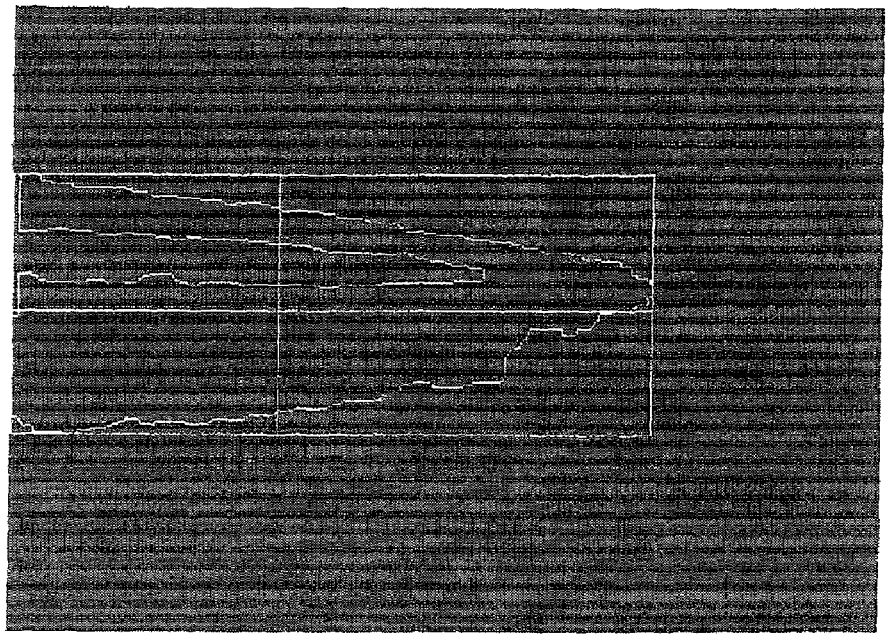

FIG. 11 shows an exemplary contour extraction with a rectangle encompassing the flame. The coordinates of the encompassing rectangle ($x_{min}$, $x_{max}$, $y_{min}$, $y_{max}$) and/or one or more other parameters such as its centre of gravity or the area of the contour or its perimeter may be calculated and displayed. The results are sent to files or memory areas to allow the archiving and tracking of the characteristics of the flame over time.

This analysis gives a good number of quantitative geometrical parameters. They may be dynamically linked with advanced control systems such as neural networks. They may thus be used as complementary inputs for on-line control of the flame.

The tracking of these flame contour parameters may advantageously be used to maintain an optimum setting of one or several type(s) of parameters of a furnace and/or of a combustion and/or of one or more burners, for example one or more of the following parameters:

1. The pressure of the atomizing fluid

In the case of a burner operating with a liquid fuel, the flame envelope parameters, and in particular the position of the root of the flame, can be used to regulate the atomization conditions, and in particular the flow rate and/or the pressure. Too low a pressure ordinarily results in too long a flame, with a flame root further from the injector.

2. The degree of staging of the flame

For the burners which allow some of the fuel or oxidant to be diverted to a secondary injector, the contour of the flame can be used to regulate the degree of staging (hence the proportion of fuel or oxidant to be directed to the secondary injector) and to optimize the length and the volume of the flame. In particular, it will be possible to seek to avoid the situations in which the flame is too close to the thermal charge (bath of glass, metallurgical products) or to the refractory walls. Regulation of the degree of staging may also be used to minimize the emissions of pollutants.

3. The fuel and oxidant flow rates

The fuel and oxidant flow rates, as well as the ratio of the oxidant/fuel flow rates, may be used to maintain a correct flame envelope. Specifically, a ratio of oxidant/fuel flow rates which is less than the stoichiometric ratio generally results in an exaggeratedly long flame, and a total flow rate (oxidant+fuel) which is too small with respect to the nominal power of the burner may cause the flame to rise towards the roof of a furnace.

4. The power and the momentum of neighbouring burners

In the case of the use of several burners, the image processing system may be used to simultaneously track the envelopes of several flames, and will make it possible to diagnose or to identify undesirable interactions between the flames of neighbouring burners. The information regarding the flame envelopes can be used to optimize the position, the modes of injection and the momentum of the fluids (mass flow rate and velocity of the fluid) of each burner in such a way as to avoid these undesirable interactions (the momentum of a fluid is equal to the product of the mass flow rate times the velocity of this fluid) These conditions relate in particular to glass furnaces and also to certain metallurgical furnaces (reheating furnaces).

5. The fraction of waste introduced to the burner

In the case of combustions in which waste is coincinerated with conventional fuels, the image processing system may be used to slave the fraction of waste coincinerated to a flame root shape and/or position. This could be the case for example in cement factory furnaces (kilns), where it is desirable to maximize the fraction of energy imparted by waste, whilst complying with satisfactory combustion characteristics (stable flame, flame root immediately downstream of the burner).

6. A fraction of total oxidant introduced by the burner

In the case of burners which associate oxidants of different oxygen concentrations (for example air and oxygen, recycled smoke and oxygen, etc), the flame contour may be used to regulate the ratio of the two oxidants in such a way as to maintain the length of the flame within an acceptable domain. Specifically, increasing the overall content of oxygen in the oxidant generally results in a shortening of the length of the flame.

7. The pressure of the furnace

The presence of air inlets in proximity to a burner may have significant consequences regarding the direction and the shape of the flame. The information regarding the envelope of the flame, possibly in combination with that arising from other sensors, may therefore be slaved to a parameter which controls the air inlets of a furnace. This parameter could be the position of a gate in the smoke exhaust duct so as to act on the pressure inside the furnace. It is also possible to act on the entry of air through a maintenance action aimed at improving leaktightness around the burner. Variations in the position of the envelope of the flame may in fact be the sign of the presence of the entry of unwanted air into the furnace.

8. The frequency of oscillation of the oxidant feed and fuel feed of a burner

In the case of the use of a valve allowing oscillatory combustion, the image acquisition can be synchronized in phase with the valve, and the image analysis can allow statistical processing on the flame or the envelope of the flame for various phases of the oscillations of the fuel/oxidant mixture. An image processing according to the invention makes it possible to check that, for each phase of the oscillation cycle, the envelope of the flame maintains acceptable characteristics. Control through video analysis, for example in combination with other sensors of temperature and of smoke composition, allows optimization of the frequency and/or of the amplitude of the oscillations so as to minimize the emission of pollutants whilst retaining a flame envelope which is compatible with the process.

Figure 12:
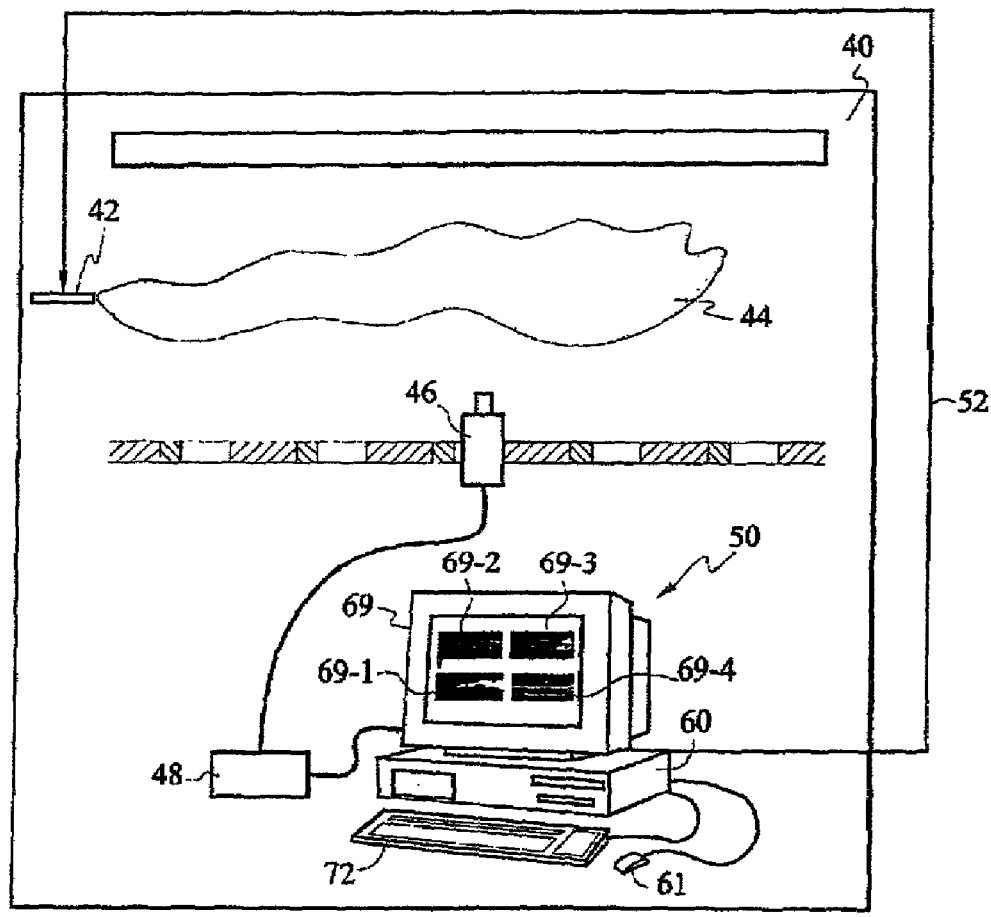
FIGS. 12 and 14 are schematic representations of devices according to the invention.

FIG. 12 represents an example of a device for implementing the invention in an industrial furnace 40.

This example is given in respect of the viewing of a flame. It applies equally to the observation of a charge in a furnace.

A burner 42 is schematically represented, together with a flame 44.

Image acquisition means, such as one or more camera(s) 46, make it possible to acquire images of the flame 44.

These images are processed by a device or a card 48 for digitizing images.

The video cameras used in industrial furnaces can operate in the visible, the ultraviolet or the infrared. To increase the contrast between the flame and the refractory walls, these cameras may be equipped with an interferometric filter (in the ultraviolet: filter centred around 310 nm to highlight the emission of the OH radical; in the visible: filter centred around 431 nm for the CH radical, or 516 nm for the C2 radical, or 589 nm for the emission of sodium; the passband of the filters is between 10 and 20 nm).

The digitized images are transmitted to computing means 50, essentially comprising a central processing unit 60, display and viewing means 69, and control peripherals such as a keyboard 72 and a mouse 61. Other means of selecting a zone or a field of a page displayed on the screen 69 may also be used, for example any means enabling a selection to be made by touching the screen.

In the case of oscillatory combustion, an additional data item is introduced into the computing system 50: this is a digital signal representative of the oscillatory periodic signal.

Figure 13:
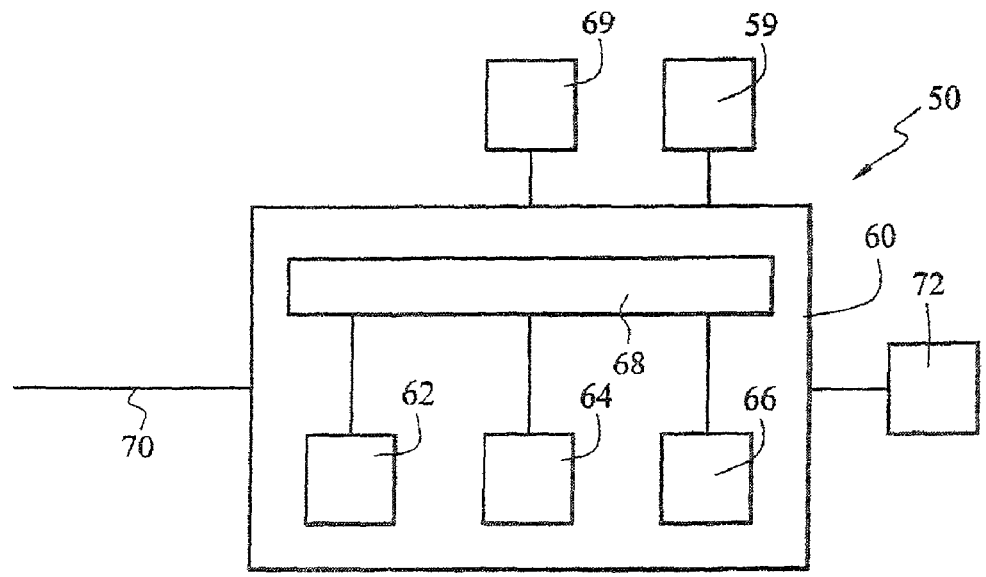
FIG. 13 represents various components of a computing system.

As illustrated in FIG. 13, the central processing unit 60 itself comprises a microprocessor 62, a RAM and ROM memory assembly 64, a hard disk 66, which also has an information storage function, all these elements being coupled to a bus 68.

The screen 69 makes it possible to view one or more raw images (before statistical processing) or images obtained after statistical processing. In FIG. 12, the screen 69 is represented with an instantaneous image 69-1, an average intermittence image 69-2, a flame envelope image 69-3 and a contour image 69-4.

The instructions for implementing a statistical processing according to the invention are stored in the memory means 64, 66 of the computing system.

Means, for example a menu and a cursor moved with the aid of the mouse, allow a user to select the statistical processing to be carried out (for example one of the first to seventh processings or algorithms which were explained hereinabove) He can also choose to carry out several of these processings in parallel.

Identical means or those of the same type may also offer the user the possibility of choosing the number n of images to be acquired so as to carry out a sliding statistical processing, and/or the duration, exact or approximate, of a sliding time interval.

Identical means or those of the same type may also offer the possibility of selecting one or more threshold values, for implementing one or other of the algorithms described above.

Identical means or those of the same type may also offer the possibility of selecting one or more argument images with a view to a statistical processing implementing the AVG (BIN(_, threshold)) function alluded to above.

The raw images acquired with the aid of the camera 46 and of the digitizing card 48 are stored in a memory area of the central processing unit 60. A set or a stack of the last n images acquired, or of the images acquired over the duration of the selected sliding interval, is in fact stored in this memory area.

Also stored in a memory area are the last n images obtained by sliding average Avg, or a stack of these last n average images, or else other stacks of images which change in the course of acquisition (for example the stack of the results of Abs(Im(i)−Im(i−1)).

The method of display may also indicate to the operator the luminous intensity corresponding to a portion or a zone of an image displayed on the screen 69.

This function is implemented by means for selecting a portion or a zone of the image, for example with the aid of the cursor, and by means of display, on the image, for example in a specified field thereof, of the intensity of the selected zone.

The user can then set a threshold value with respect to such information, for example by selecting a specific field of the screen.

In contour display mode (FIG. 11 and image 69-4 in FIG. 12), also displayed are the quantitative values of coordinates of the contour frame, and possibly the calculated values such as the centre of gravity, and/or the area of the contour and/or the perimeter of this contour.

The instructions of the programs for implementing a method according to the invention are stored in a memory area of the computing system 50. These instructions are for example installed from a medium which can be read by this system, and on which they are recorded. Such a medium can for example be a hard disk, a ROM read-only memory, an optical compact disc, a DRAM dynamic random-access memory or any other type of RAM memory, a magnetic or optical storage element, registers or other volatile and/or nonvolatile memories.

The device can be used to view instantaneous images or those resulting from statistical processing. This information is already of great utility in the monitoring and understanding of combustion.

From this information an operator may possibly act on parameters controlling the furnace or the burner(s) (for example power and/or stoichiometric ratio, etc) in order to control one or more parameters characterizing the position and the geometry of the flame or of the flames (in the case of several burners).

This may also be one of the parameters 1 to 8 already alluded to hereinabove.

As illustrated in FIG. 12, the device can furthermore comprise means 52 for regulating parameters, for example one or more of the parameters 1 to 8 alluded to hereinabove. This regulation may be performed, for example, on the basis of an analysis of the images obtained by statistical processing, for example an analysis implementing a neural processing and/or fuzzy logic control. The command 52 then makes it possible to regulate, for example, the opening of a fuel or oxidant feed valve.

Figure 14:
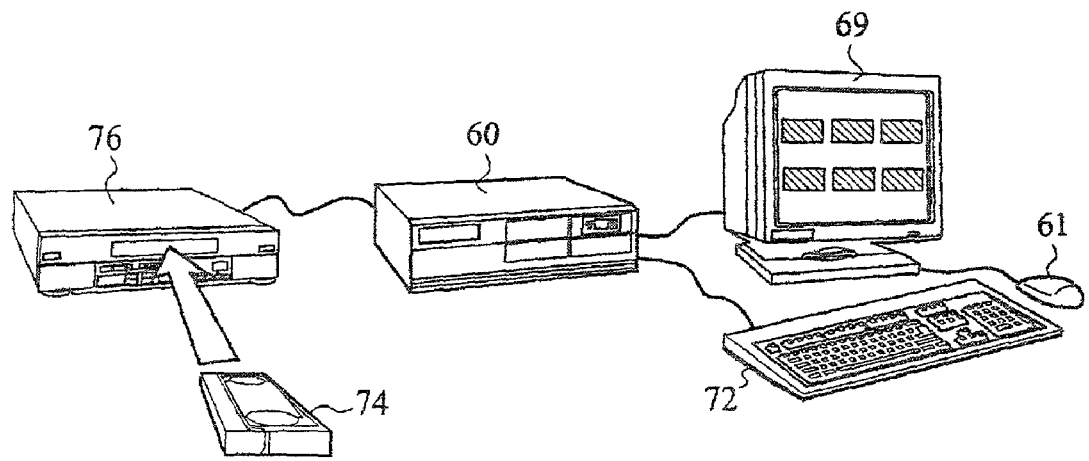

According to another exemplary use of a device according to the invention, the images obtained by digitization may be stored on a video cassette 74 (see FIG. 14) which may then be read by a video recorder 76. After digitization, the images may be viewed on a computing system 50 such as already described hereinabove. An analysis of the combustion or of the flame may thus be carried out later, in the laboratory.

Each raw video image results from the combination of three colours or three channels R (red), G (green) and B (blue). It may be advantageous, in certain cases, to adopt just a single channel. For example, in certain cases, the R channel is highly saturated, the B channel has a small contribution and the G channel is the most "balanced". Hence, only the G channel is selected.

For each type of image (instantaneous or obtained by statistical processing), the device can therefore comprise means for selecting a display of the images in just one of the colours R, G, B, or in two of these colours. These means (for example a menu from which the user selects one or more fields with a cursor) also make it possible to select, for each given type of image, a representation of the ratio of two of these colours in the image.

The images are coded on 8 bits (hence on 256 intensity levels).

In the case of the algorithms hereinabove for which the function Avg is applied to a binarized image, each pixel is averaged with the corresponding pixels of the other images. This results, for each pixel, in an intensity value of between 0 and 1, which is then reconverted into full scale (on 256 intensity levels) by multiplication by 255.

All the image processings indicated in the present description and which involve the choice of a threshold are, on account of this threshold, arbitrary or biased. However, this arbitrary character is constant over time, it is the same for all the n images of the sliding interval Tg or for all the last n images.

The processing of the images according to the invention is much less cumbersome and demanding in terms of computational capacity than the system described in U.S. Pat. No. 5,971,747, where the neural processing is applied to each image. According to the present invention, a sliding statistical processing is applied to the images, and a neural processing such as described in U.S. Pat. No. 5,971,747 is not necessary. Such neural processing only comes into a regulating loop, should there be one, such as the loop 52 described hereinabove (FIG. 12).

The invention applies to the viewing and to the control of flames or of combustion in a furnace, but also in any type of other industrial environment, open air included.

The invention and the statistical processing described also make it possible to characterize fluctuations of a scene in a furnace, for example of a charge present in the furnace (lumps floating on the surface of a bath of glass, line showing the boundary of the presence of unmolten material in a melting furnace, spatial envelope of the trajectory of billets in metallurgical furnaces, etc). Any one of the algorithms described hereinabove may then be applied, with the same advantages as that which was described for the case of a flame. In particular, it is possible to apply a contour extraction function to the fluctuating zone of the charge in the furnace, to deduce therefrom geometrical parameters such as those already mentioned hereinabove (perimeter of the contour, and/or centre of gravity, and/or area of the contour), and possibly to perform regulation of the bath (its temperature or its feeding with charge) or of the trajectory of the billets.

The invention makes it possible to view, in a furnace, any element of the time-fluctuating kind or of a luminosity which differs from the luminosity of the environment.

The invention claimed is:

1. Method of processing images of at least one flame or of a scene in a furnace, comprising at least one sliding statistical processing of the images of the flame which are captured in the course of a sliding time interval, so as to eliminate fast fluctuations therefrom, wherein the statistical processing comprises a calculation of sliding average of the images of the flame or of the scene which are captured in the course of the sliding time interval or of the last n images and/or a processing making it possible to obtain the spatial envelope of the fluctuations of the flame or of the scene.

2. Method according to claim 1, the time interval being of variable duration.

3. Method of processing images of at least one flame or of a scene in a furnace, comprising after having acquired n images of the flame or of the scene:
   (a) performing at least one statistical processing of the last n images;
   (b) acquiring a new image when the processing (a) is finished; and
   (c) repeating step (a);
   wherein the statistical processing comprises a calculation of sliding average of the images of the flame or of the scene which are captured in the course of the sliding time interval or of the last n images and/or a processing making it possible to obtain the spatial envelope of the fluctuations of the flame or of the scene.

4. Method according to claim 1, the statistical processing being performed on a series of images such that:
   the gap between two successive processed images is between 5 seconds and 1000 seconds.

5. Method according to claim 4, the gap between two successive processed images being between 20 seconds and 200 seconds.

6. Method according to claim 1, the number of images contained in a series of images processed by sliding statistical processing being greater than 10.

7. Method according to claim 6, the number of images contained in a series of images processed by sliding statistical processing being between 25 and 1000.

8. Method according to claim 1, the statistical processing further comprising a calculation of variance of the images over time.

9. Method according to claim 1, the statistical processing making it possible to produce, from each image, an image of its instantaneous fluctuations.

10. Method according to claim 9, the processing of the images comprising the following steps:
    the calculation, for each series of n images of one and the same sliding time interval, or for each series of last n images, of an average image,
    the calculation, for each image of the series of n images or of last n images, of the difference between the image and the averaged image of the series of n images,
    the comparison of each difference image thus obtained with a predetermined threshold value, so as to obtain an image referred to as a binarized image.

11. Method according to claim 1, wherein the statistical processing comprises a processing making it possible to obtain the spatial envelope of the fluctuations of the flame or of the scene, the processing of the images comprising the following steps:
    the calculation, for each series of n images of one and the same sliding time interval, or for each series of last n images, of an average image,
    the calculation, for each image of the series of n images or of last n images, of the difference between the image and the averaged image of the series,
    the comparison of each of the n difference images thus obtained with a predetermined threshold value, so as to obtain an image referred to as a binarized image,
    the calculation of an average image of the n binarized images thus obtained.

12. Method according to claim 1, wherein the statistical processing comprises a processing making it possible to obtain the spatial envelope of the fluctuations of the flame or of the scene, the processing of the images comprising the following steps:
    the calculation, for each image of a series of n images of one and the same sliding time interval, or for each image of a series of last n images, of the difference between the image and the image which precedes it in the series,
    the comparison of each difference image thus obtained with a predetermined threshold value, so as to obtain an image referred to as binarized image,
    the calculation of an average image of the n binarized images thus obtained.

13. Method according to claim 1, the statistical processing further comprising:
    the comparison of each image of a series of n images of one and the same sliding time interval, or of each image of a series of last n images, with a predetermined threshold, so as to obtain a binary image,
    the calculation of an average image of the n binary images thus obtained.

14. Method according to claim 1, wherein the statistical processing comprises a processing making it possible to obtain the spatial envelope of the fluctuations of the flame or of the scene, furthermore comprising a step of extracting or of segmenting contours.

15. Method according to claim 14, furthermore comprising a step of calculating the rectangle encompassing the contour of the flame or of the fluctuating zone of the scene and/or of the centre of gravity of this contour and/or of the area of this contour and/or of the perimeter of this contour.

16. Method according to claim 1, the images being those of the flame of a combustion occurring in an industrial furnace during operation.

17. Method according to claim 1, the images being those of a flame of an oscillatory combustion.

18. Method according to claim 17, the processed images being synchronized images or those in phase with the oscillatory combustion or with a phase of the oscillatory combustion.

19. Method of regulating physical parameters of a flame or of a combustion, implementing a method of processing images of the flame according to claim 1, and a step of regulating a physical parameter of the flame or of the combustion or of a furnace in which the combustion is occurring.

20. Method according to claim 19, the physical parameter comprising at least the length or the volume or the position of the flame, or the relative position of the flames in the case of a plurality of burners.

21. Method according to claim 19, the physical parameter comprising at least the flow rate or the pressure of atomization of a liquid fuel, or the degree of staging of a fuel or of an oxidant, or the flow rate of a fuel or of an oxidant, or, in the case of a plurality of burners, the position and/or the mode of injection and/or the momentum of at least one burner, or a fraction of waste reintroduced into a burner, or, in the case of the use of at least two oxidants, a concentration ratio of these oxidants, or the pressure of a furnace in which the combustion is occurring.

22. Method according to claim 19, the combustion being of oscillatory type, the physical parameter comprising at least one frequency of oscillation or an amplitude of the oscillatory oxidant and/or fuel feeds of a burner.

23. Method according to claim 1, the images being those of a charge in a furnace.

24. Method according to claim 23, the images being those of a bath of glass, or of a bath in a melting furnace, or of trajectories of billets.

25. Device for processing images of at least one flame or of a scene in a furnace, comprising means for receiving images of a flame or of a scene situated in a furnace, and means for performing at least one sliding statistical processing of these images, wherein the means for performing at least one statistical processing comprise means for performing a calculation of sliding average of the images and/or a processing making it possible to obtain the spatial envelope of the flame or of the scene or of their fluctuations.

26. Device for processing images of at least one flame, comprising:
   means for storing n images of the flame or of the scene, acquired chronologically,
   means for performing at least one statistical processing of the last n images,
   means for storing an additional image, when the statistical processing is finished;
   wherein the means for performing at least one statistical processing comprise means for performing a calculation of sliding average of the images and/or a processing making it possible to obtain the spatial envelope of the flame or of the scene or of their fluctuations.

27. Processing device according to claim 25, the means for performing at least one statistical processing further comprising means for performing a calculation of variance of the images over time, and/or a processing so as to produce, from each image, an image of its instantaneous fluctuations.

28. Device according to claim 25, furthermore comprising means for selecting one or more statistical processing(s) of the images of the flame or of the scene.

29. Device according to claim 25, furthermore comprising means for selecting a number of images on which one or more statistical processing(s) is to be performed.

30. Device according to claim 25, furthermore comprising means for selecting a duration of a sliding time interval.

31. Device according to claim 25, furthermore comprising means for selecting a zone or a portion of an image of the flame or of the scene, and for displaying a value of intensity in this zone or portion.

32. Device according to claim 25, furthermore comprising means for selecting one or more threshold value(s) for the implementation of one or more statistical processing(s) of the images of the flame or of the scene.

33. Device according to claim 25, furthermore comprising means for viewing images after statistical processing(s).

34. Device according to claim 25, the images being recorded by one or more analog or digital video camera(s).

35. Combustion system comprising a burner, means for injecting at least one oxidant and at least one fuel into the burner, and a processing device according to claim 25.

36. System according to claim 35, furthermore comprising means for regulating a physical parameter of the flame or of the combustion or of a furnace in which the combustion is occurring.

37. Industrial furnace, comprising a charge and a device for processing images of the charge according to claim 25.

38. Computer program comprising program code instructions on a readable medium for executing the steps of the method according to claim 1 when the program is executed on a computer.

39. Computer program product comprising program code means for a program recorded on a medium usable in a computer, comprising computer-readable programming means for performing the steps according to claim 1.

40. Processing device according to claim 26, the means for performing at least one statistical processing further comprising means for performing a calculation of variance of the images over time and/or a processing so as to produce, from each image, an image of its instantaneous fluctuations.

41. Device according to claim 26, furthermore comprising means for selecting one or more statistical processing(s) of the images of the flame or of the scene.

42. Device according to claim 26, furthermore comprising means for selecting a duration of a sliding time interval.

43. Device according to claim 26, furthermore comprising means for selecting a duration of a sliding time interval.

44. Device according to claim 26, furthermore comprising means for selecting a zone or a portion of an image of the flame or of the scene, and for displaying a value of intensity in this zone or portion.

45. Device according to claim 26, furthermore comprising means for selecting one or more threshold value(s) for the implementation of one or more statistical processing(s) of the images of the flame or of the scene.

46. Device according to claim 26, furthermore comprising means for viewing images after statistical processing(s).

47. Device according to claim 26, the images being recorded by one or more analog or digital video camera(s).

48. Combustion system comprising a burner, means for injecting at least one oxidant and at least one fuel into the burner, and a processing device according to claim 26.

49. Industrial furnace, comprising a charge and a device for processing images of the charge according to claim 26.

* * * * *